UNITED STATES PATENT OFFICE.

PAUL VOLKMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

YELLOW AZO DYE.

935,829.  Specification of Letters Patent.  Patented Oct. 5, 1909.

No Drawing.  Application filed April 20, 1909.  Serial No. 491,134.

*To all whom it may concern:*

Be it known that I, PAUL VOLKMANN, doctor of philosophy, chemist, citizen of the German Empire, residing at Elberfeld, Germany, have invented new and useful Improvements in Azo Dye, of which the following is a specification.

My invention relates to the manufacture of new yellow azo-dyes by combining 1-sulfoaryl-3-methyl-5-pyrazolones of the general formula:

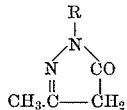

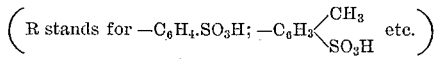

with the diazo compounds of toluidins.

The new coloring matters thus obtained are after being dried and pulverized yellow powders soluble in water with a yellow color. They yield upon reduction with stannous chlorid and hydrochloric acid toluidins and 1-sulfoaryl-3-methyl-4-amino-5-pyrazolones. They dye wool from acid baths yellow shades. My new dyes are characterized by their coloring power which is more than double the strength of that of the analogous anilin dyes; and by their fastness.

To illustrate my process, I can proceed as follows, the parts being by weight:—107 parts of paratoluidin are diazotized and the diazo compound is added to a solution of 254 parts of 1-para-sulfophenyl-3-methyl-5-pyrazolone containing an excess of sodium carbonate. The mixture is stirred for 4 hours and the dyestuff which precipitates is filtered off and dried.

It is an orange-yellow crystalline powder soluble in concentrated sulfuric acid with a yellow color. Upon reduction with stannous chlorid and hydrochloric acid the dye is decomposed, paratoluidin and 1-para-sulfophenyl-3-methyl-4-amino-5-pyrazolone being obtained. It produces on wool bright yellow level shades, fast to light. In a similar manner coloring matters can be obtained on using other toluidins or other 1-sulfoaryl-3-methyl-5-pyrazolones. The same dyestuffs can be obtained by at first preparing the dyes from arylmethylpyrazolones and then sulfonating the dyes thus obtained.

I claim:

1. The herein-described new coloring matters obtainable from toluidins and 1-sulfoaryl-3-methyl-5-pyrazolones, which are in dry state yellow powders soluble in water with a yellow color; yielding upon reduction with stannous chlorid and hydrochloric acid toluidins and 1-sulfoaryl-3-methyl-4-amino-5-pyrazolones; and dyeing wool yellow shades, substantially as described.

2. The herein-described new coloring matter obtainable from para-toluidin and 1-parasulfophenyl-3-methyl-5-pyrazolone, which is in dry state an orange-yellow crystalline powder soluble in concentrated sulfuric acid with a yellow color; yielding upon reduction with stannous chlorid and hydrochloric acid paratoluidin and 1-parasulfophenyl-3-methyl-4-amino-5-pyrazolone; and dyeing wool bright yellow shades, substantially as described.

In testimony whereof I have hereunto set my hand in the presence of two subscribing witnesses.

PAUL VOLKMANN. [L. S.]

Witnesses:
 OTTO KÖNIG,
 C. J. WRIGHT.